(12) United States Patent
Kozakura

(10) Patent No.: US 9,575,626 B2
(45) Date of Patent: Feb. 21, 2017

(54) IMAGE DISPLAY APPARATUS AND CONTROL METHOD THEREFOR

(71) Applicant: CANON KABUSHIKI KAISHA, Tokyo (JP)

(72) Inventor: Kozue Kozakura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 14/372,249

(22) PCT Filed: Jan. 9, 2013

(86) PCT No.: PCT/JP2013/050706
§ 371 (c)(1),
(2) Date: Jul. 15, 2014

(87) PCT Pub. No.: WO2013/111654
PCT Pub. Date: Aug. 1, 2013

(65) Prior Publication Data
US 2014/0344758 A1 Nov. 20, 2014

(30) Foreign Application Priority Data
Jan. 23, 2012 (JP) ................................. 2012-011507

(51) Int. Cl.
*G06F 3/0481* (2013.01)
*H04N 5/93* (2006.01)
(Continued)

(52) U.S. Cl.
CPC ....... *G06F 3/04817* (2013.01); *G06F 3/04842* (2013.01); *G06F 3/04845* (2013.01);
(Continued)

(58) Field of Classification Search
CPC .................................................. G06F 3/0481
See application file for complete search history.

(56) References Cited

U.S. PATENT DOCUMENTS

| | | | |
|---|---|---|---|
| 2010/0323730 A1 | 12/2010 | Karmarkar | |
| 2011/0122293 A1* | 5/2011 | Yamada | ..................... G06T 1/00 348/231.6 |
| 2012/0233531 A1* | 9/2012 | Ma | ..................... G06F 17/30265 715/205 |

FOREIGN PATENT DOCUMENTS

| | | | |
|---|---|---|---|
| CN | 101017506 A | 8/2007 | |
| CN | 101063977 A | 10/2007 | |

(Continued)

OTHER PUBLICATIONS

Dec. 3, 2015 German Office Action that issued in German Patent Application No. 112013000652.9.

(Continued)

*Primary Examiner* — Peiyong Weng
(74) *Attorney, Agent, or Firm* — Cowan, Liebowitz & Latman, P.C.

(57) ABSTRACT

An image display control apparatus enables determination as to whether or not an image file includes position information, and further, facilitates checking of positioning method of the position information. Accordingly, in the apparatus, positioning information in the image file is analyzed, and it is determined whether or not a positioning method indicating a positioning method for the position information is described. Further, when it is determined that the positioning method is described, the type of the positioning method is determined. Then an icon for discrimination of the presence/absence of positioning method and type of the positioning method is superimposed on a thumbnail of an image indicated with a corresponding image file.

8 Claims, 11 Drawing Sheets

(51) Int. Cl.
*G06F 17/30* (2006.01)
*G06F 3/0484* (2013.01)

(52) U.S. Cl.
CPC .... *G06F 17/3028* (2013.01); *G06F 17/30274* (2013.01); *H04N 5/93* (2013.01)

(56) References Cited

FOREIGN PATENT DOCUMENTS

| | | |
|---|---|---|
| GB | 2455589 A | 6/2009 |
| JP | 2007-323543 A | 12/2007 |
| JP | 2009-099024 A | 5/2009 |
| JP | 2009-124254 A | 6/2009 |
| JP | 2009-164966 A | 7/2009 |
| JP | 2009-260599 A | 11/2009 |
| JP | 2010-281734 A | 12/2010 |
| JP | 2011-124812 A | 6/2011 |
| JP | 2012-141467 A | 7/2012 |
| WO | 2011/069291 A1 | 6/2011 |

OTHER PUBLICATIONS

Apr. 18, 2016 Japanese Office Action that issued in Japanese Patent Application No. 2013-138393.
Oct. 26, 2016 Japanese Office Action that issued in Japanese Patent Application No. 2013138393.
The above foreign patent documents were cited in a Nov. 2, 2016 Chinese Office Action, which is enclosed with an English Translation, that issued in Chinese Patent Application No. 201380004558.0.

\* cited by examiner

F I G. 7A
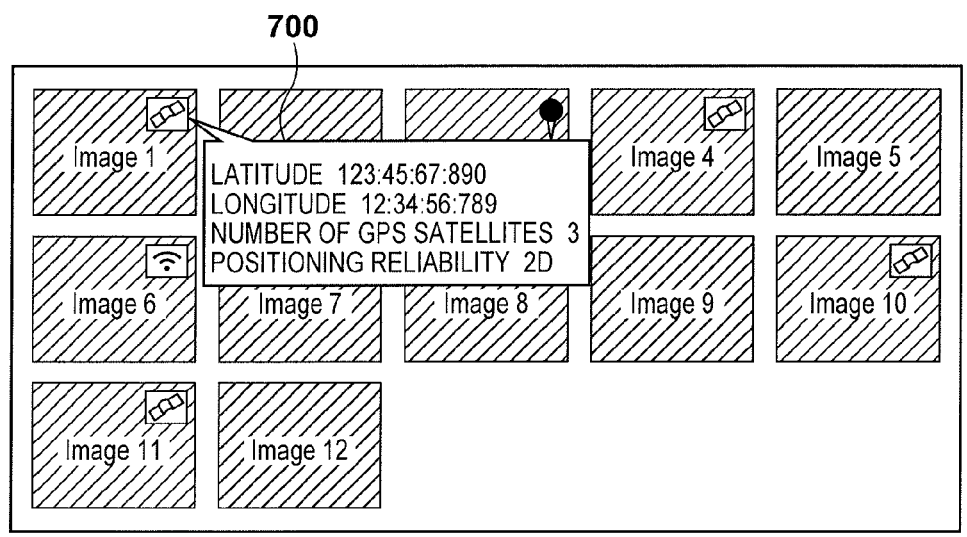
F I G. 7B
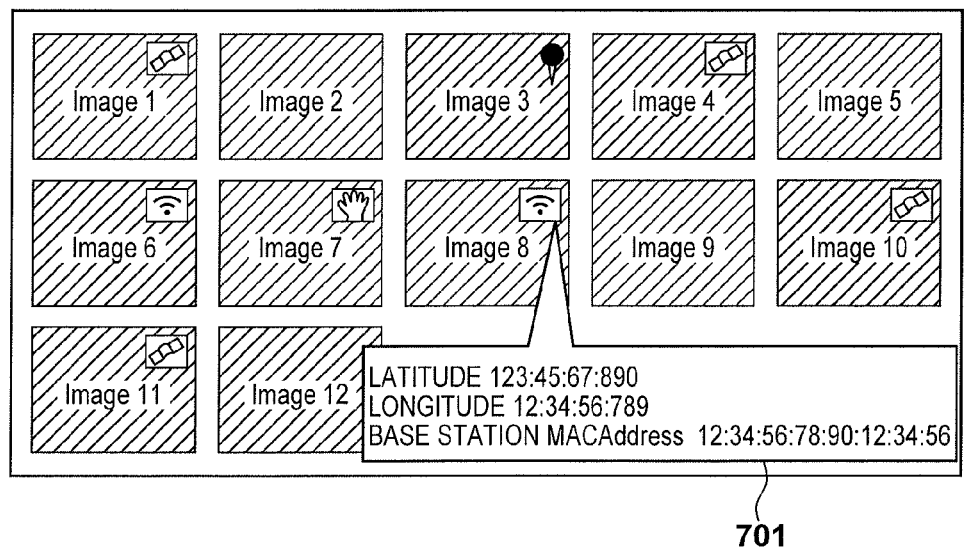

IMAGE DISPLAY APPARATUS AND CONTROL METHOD THEREFOR

CROSS-REFERENCE TO RELATED APPLICATIONS

This application is a national stage application of International Application No. PCT/JP2013/050706 filed Jan. 9, 2013, whose benefit is claimed and which claims the benefit of Japanese Patent Application No. 2012-011507, filed Jan. 23, 2012, the entire disclosures of which are incorporated herein by reference.

TECHNICAL FIELD

The present invention relates to an apparatus which displays a list of images and its control method.

BACKGROUND ART

Recently, some digital cameras and mobile terminals with a built-in camera are capable of recording position information as attribute information of image data obtained by image sensing. Further, some personal computer (PC) applications display image data where the above-described position information is recorded distinctively from image data where position information is not recorded. For example, Japanese Patent Laid-Open No. 2007-323543 discloses a technique of displaying an icon which indicates whether or not position information is recorded as attribute information of image data to be described, so as to distinguish such image data where position information is recorded from image data where position information is not recorded.

However, in the above-described conventional technique, while it is possible to know whether or not position information is recorded in image data, it is not possible to determine the positioning method used to acquire the position information.

There are a plurality of types of positioning methods to obtain position information. For example, in the case of a digital camera having a GPS (Global Positioning System) receiver, under a condition where a signal can be received from a GPS satellite, position information, obtained based on the signal, is recorded as attribute information of image data. Further, in the case of a digital camera or mobile terminal having a wireless LAN, position information, obtained from the nearest radio base station, can be recorded in image data. In addition, arbitrary position information may be recorded by manual operation with a console, in image data where no position information is recorded. There is a probability of erroneous input due to manual operation. As described above, plural sets of position information exist in view of accuracy and credibility. To check the accuracy and credibility of the position information, it is insufficient to merely determine presence/absence of position information.

SUMMARY OF INVENTION

The present invention has been made to solve the above problem. For example, this disclosure provides an image display apparatus having the structure as follows.

That is, there is provided an image display control apparatus which performs control to display a list of image files stored in storage means, comprising: determination means for analyzing each image file stored in the storage means, and determining whether or not the image file includes position information indicating a position and whether or not, when the image file includes the position information, positioning method information indicating a positioning method for the position exists; and display control means for, upon display of the list of image files stored in the storage means, in accordance with the result of determination by the determination means, displaying an image file including the position information in a appearance distinguishable from an image file not including the position information, while displaying a type of the positioning method indicated with the positioning method information in the image file including the position information, in a distinguishable appearance.

According to the disclosure, it is possible to not only determine whether or not an image file includes position information, but also easily check a positioning method of obtaining the position information.

Further features of the disclosure will become apparent from the following description of exemplary embodiments (with reference to the attached drawings).

BRIEF DESCRIPTION OF DRAWINGS

The accompanying drawings, which are incorporated in and constitute a part of the specification, illustrate embodiments and, together with the description, serve to explain the principles of the invention.

FIGS. 7A and 7B are display examples of details of position information in balloon form;

DESCRIPTION OF EMBODIMENTS

Hereinbelow, embodiments of the present invention will be described in detail in accordance with the attached drawings.

Note that as an apparatus according to the embodiments of the present invention, a general-purpose image processing apparatus such as a personal computer (hereinbelow, "PC") will be used. However, since the present invention is applicable to any apparatus as long as it performs control to display a list of image files such as a digital camera, a cellular phone, a so-called tablet terminal and a car navigation system, the present invention is not limited to the type of apparatus.

[First Embodiment]

Figure 1:
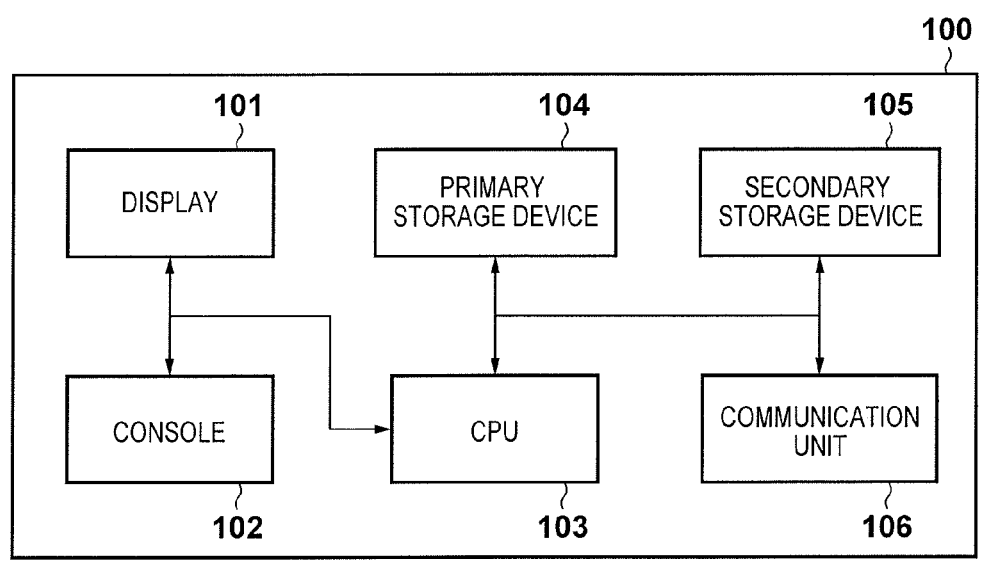
FIG. 1 is a block diagram showing an image processing apparatus according to an embodiment.

FIG. 1 is a block diagram showing the configuration of a PC which functions as an image processing apparatus 100 according to a first embodiment.

The image processing apparatus 100 has a display 101, a console 102, a CPU 103, a primary storage device 104, a secondary storage device 105, and a communication unit 106. The display 101, which is e.g. a liquid crystal display, displays data such as characters and images and a so-called graphical user interface such as a menu. Note that the display 101 may be incorporated in the image processing apparatus 100, or may be separately provided. That is, the image processing apparatus 100 may be any type of apparatus as long as it has at least an interface for connection with the display and controls the display. The console 102, having a keyboard, a mouse and the like, receives a user's operation. Note that the console 102 may have buttons, levers, a touch panel and the like. The CPU 103 performs various calculations, controls respective constituent elements of the image processing apparatus 100, and performs processing related to display control for display in list form based on image file analysis and its result of analysis. Further, the CPU 103 performs processing for communication control. The primary storage device 104 is used for storage of temporary data, programs executed with the CPU 103, and is used as a work area. The primary storage device 104 is typically a RAM. The secondary storage device 105, which is used for storage of an operating system (OS) to control the image processing apparatus 100, various application programs, various files (including image files) and the like. The secondary storage device 105 is typically a hard disk, a nonvolatile semiconductor memory or the like. The communication unit 106 is a wireless LAN interface for communication with an external device. It may be any type of apparatus, such as a cable LAN interface, a USB interface and the like as long as it communicates with the external device. It is possible to receive image files from an external device (for example, a digital camera and a cellular phone) via the communication unit 106 and manage the stored image files.

<Position Information>

Figure 2:
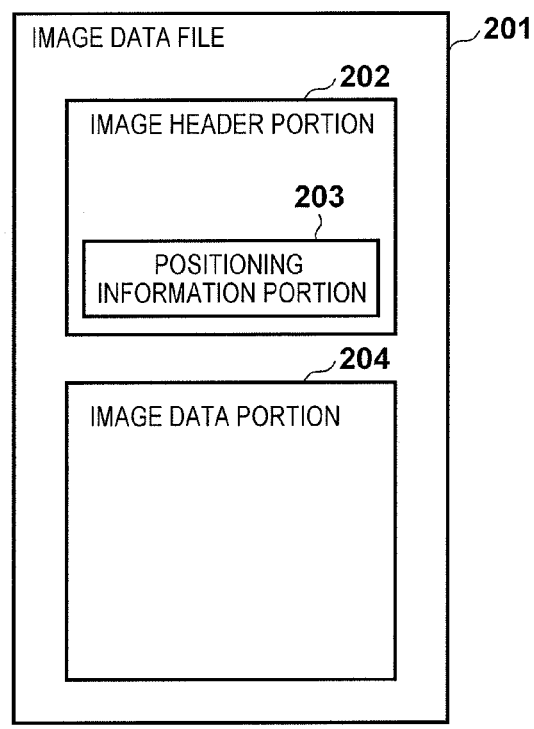
FIG. 2 illustrates a data structure of an image file.

FIG. 2 shows the data structure of an image file stored and managed in the image processing apparatus 100. In the present embodiment, a file format in conformity with Exif standard is employed.

Image data 201 is stored and managed in the secondary storage device 105 as a file. When the image processing apparatus 100 processes the image data 201, the image data 201 is temporarily copied in the primary storage device 104 in some cases. Image header portion 202 holds information attached to the image data. For example, the attached information includes date and time of image sensing, a shutter speed, f number, ISO film speed and the like. A positioning information portion 203 exists as a portion of the image header portion 202. The positioning information portion 203 holds GPS-related information handled in the present embodiment. An image data portion 204 holds an image data main body.

Note that the image header portion 202 and the positioning information portion 203 are not necessarily limited to the Exif format. For example, the image header portion 202 and the positioning information portion 203 may be recorded in other file than the image data, or may be recorded in a database of the image processing apparatus 100.

Figure 3:
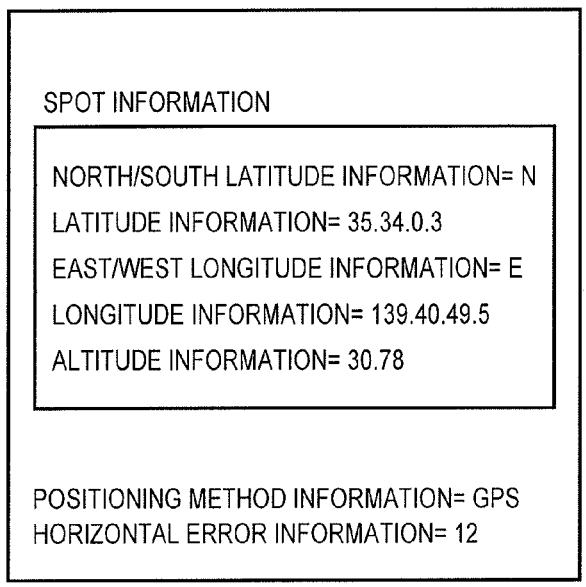
FIG. 3 illustrates a data structure of position information portion.

FIG. 3 shows an example of information held in the positioning information portion 203. North/south latitude information is latitude information having a value indicating north latitude or south latitude. Latitude information indicates a latitude. East/west longitude information is longitude information having a value indicating an east longitude or west longitude. Longitude information indicates a longitude. Altitude information indicates an altitude. In the present embodiment, the above-described north/south latitude information, latitude information, east/west longitude information, longitude information and altitude information will be generally referred to as spot information. Further, positioning method information indicates a positioning method used in the positioning of the spot. Note that all the devices do not have a function of describing positioning method information. Some devices describe only spot information in image data.

The positioning method information in the present embodiment may have four types of values. The first positioning method information is CELLID of positioning method using cellular-phone base station information. To obtain a current position from the cellular-phone base station, the following various methods are available. For example, the position of a base station communicating with a cellular phone is obtained as the current position of the cellular phone. Otherwise, the current position is estimated from the difference among arrival time of radio waves from plural base stations and the positions of the respective base stations.

The second positioning method information is WLAN of positioning method using wireless LAN. The acquisition of current position is made as follows. Radio waves are received from single or plural wireless LAN access points, and the current position is estimated from the intensities of the respective radio waves and the positions of the access points.

The third positioning method information is GPS of positioning method using information received from plural satellites. The current position is calculated from the received information.

The fourth positioning method information is MANUAL generally indicating position information inputted by a user's manual operation. The input of this value greatly depends on packaging. For example, when latitude and longitude are directly inputted or when latitude and longitude are inputted by the user's designation of a particular point on a map, this value may be used.

Horizontal error information indicates a horizontal error of the spot information, i.e., an error between the latitude information and the longitude information. The error is set in accordance with positioning conditions. For example, in the case of GPS system, the error is estimated from a DOP value, the number of GPS satellites from which radio-wave have been received and the intensities of the radio waves.

Note that in the example of FIG. 3, the current position is at 35 degrees 34 minutes 0.3 seconds north latitude, 139 degrees 40 minutes 49.5 seconds east longitude, and 30.78 meters altitude. The positioning method information indicates the GPS, and the horizontal error is 12 meters.

Note that some of recent cellular phones with a built-in camera perform so-called hybrid type positioning of obtaining spot information with higher accuracy by combined plural positioning methods. In the present embodiment, in this case, all the utilized positioning methods are added to the positioning method information. That is, when positioning information is determined based on GPS and information on the wireless LAN access points, the positioning method information is "GPS WLAN". Note that in the present embodiment, the positioning methods are described in the order of contribution upon determination of positioning information. The level of contribution is calculated based on error amount and the reliability of predetermined positioning method itself. In the above-described example of the "GPS WLAN", the GPS positioning method has higher level of contribution in comparison with the positioning method using cellular phone wireless LAN. In the present embodiment, the first positioning method information and the second positioning method information are described, however, it may be arranged such that three or more positioning method information are described.

<Screen Display>

Figure 4A:
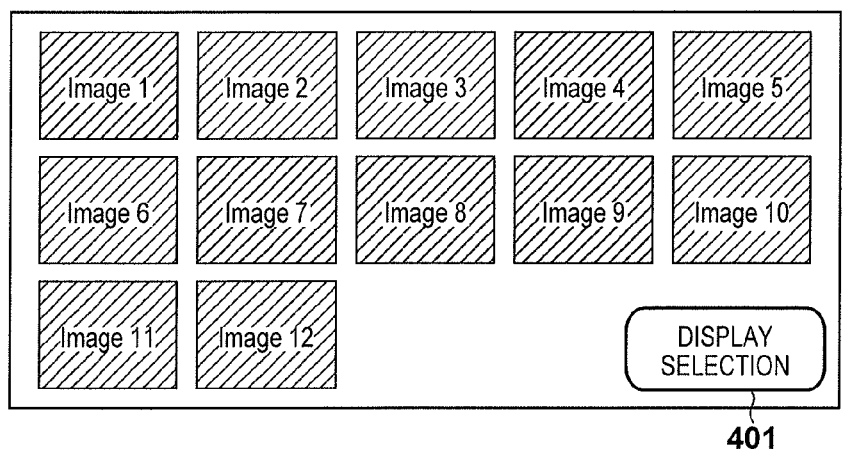
FIGS. 4A to 4C are display examples of images in list form in the first embodiment.

Next, an image data display method in the present embodiment will be described. FIG. 4A shows an example of a screen displayed on the display 101 when an image display application is started on the present apparatus.

In FIG. 4A, image data Image 1 to Image 12, stored in the secondary storage device 105, are displayed in list form. These images are obtained from e.g. a digital camera or a cellular phone. Further, the images may be downloaded from a server or the like on a network. Further, thumbnails of image data in place of image data themselves may be used.

A display selection button 401 is used for selecting display of information related to position information. When the display selection button 401 in the status shown in FIG. 4A is designated by click operation or the like via the console 102, the screen changes to a screen shown in FIG. 4B.

Figure 4B:
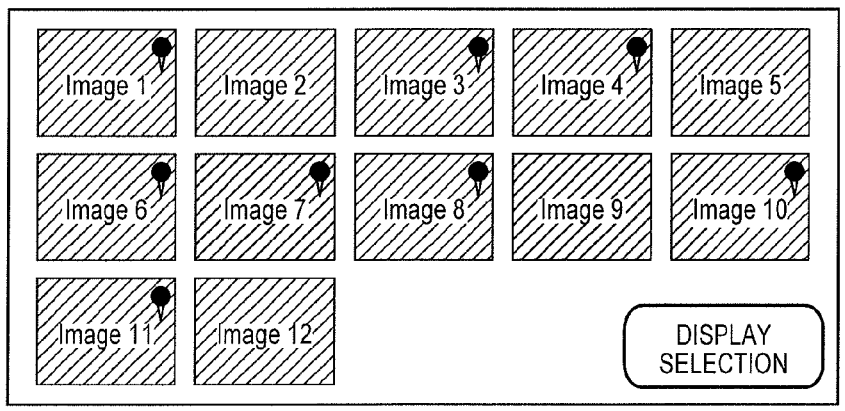

As shown in FIG. 4B, regarding image data to which position information is added, a "pin" shaped icon (hereinbelow, "pin icon") is superimposed on the thumbnail of the image. That is, the pin icon is displayed with respect to an image file having position information portion. In this screen example, latitude and longitude information are described as positioning information with respect to the Images 1, 3, 4, 6, 7, 8, 10 and 11. Note that the pin icon is not necessarily superimposed completely on the thumbnail. It may be arranged such that a part of the pin icon is superposed or the pin icon is not superimposed on the thumbnail of the image data but displayed in the vicinity of the thumbnail as long as it is possible to distinguish image files having positioning information from images without positioning information. Note that in this screen, the pin icon is superimposed on image data where the latitude and longitude information are described regardless of positioning method information. It is possible for the user to easily know image data having position information by checking the screen.

Figure 4C:
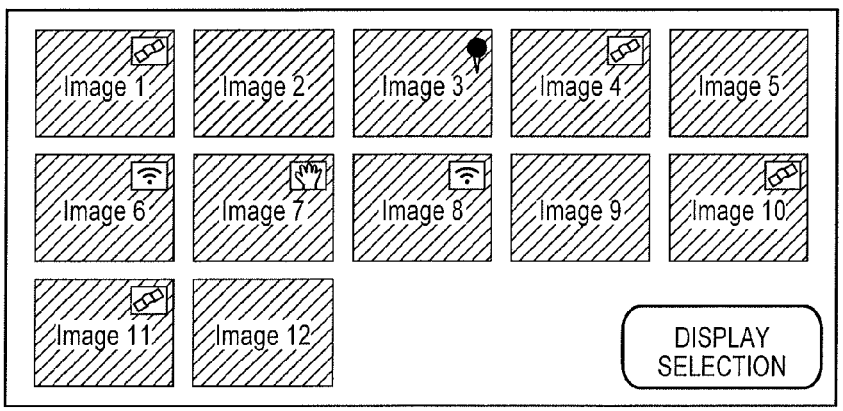

Further, in the status shown in FIG. 4B, when the display selection button 401 is designated by click operation or the like, the screen changes to a screen shown in FIG. 4C. As shown in the screen in FIG. 4C, it is possible to discriminate a positioning method by replacing the pin icon with an icon corresponding to positioning method. For example, an icon indicating a satellite (hereinbelow, "GPS icon") is superposed on the Images 1, 4, 10 and 11. This means that the positioning method information indicates "GPS", i.e., the positioning method information indicates that the image data has spot information obtained by using GPS. An icon indicating a radio wave (hereinbelow, "wireless LAN icon") is superimposed on the Images 6 and 8. This means that the positioning method information is "WLAN", i.e., the positioning method information indicates that the image data has spot information obtained by using wireless LAN. An icon indicating a hand (hereinbelow, "manual-operation icon") is superimposed on the Image 7. This means that the positioning method information is "MANUAL", i.e., the positioning method information indicates that the image data has spot information obtained by manual operation. The pin icon is superposed on the Image 3. This indicates that the image data has no positioning method information. Note that when the positioning method information is "CELLID", an icon different from any of the pin icon, the GPS icon, the wireless LAN icon and the manual operation icon (hereinbelow, "cell icon"), is superimposed on the image data.

As described above, in the screen shown in FIG. 4C, an icon corresponding to positioning method is superimposed on image data. With this arrangement, it is possible for the user to easily check the positioning method used in the positioning of each image data. Note that in the display screen in FIG. 4C, when the display selection button 401 is clicked, the screen changes to the screen in FIG. 4A. That is, every time the display selection button 401 is clicked, the above-described three display screens are sequentially displayed.

Hereinbelow, a thumbnail list display processing in the image display application according to the first embodiment of the present invention will be described in accordance with the flowchart of FIG. 5. Note that it may be arranged such that when the apparatus communicates with an external device via the communication unit 106 and image data file is received, the image display application is started in accordance with the reception of the image data file. Otherwise, it may be arranged such that when the user inputs an instruction from the console 102, the image display application is started. In any case, upon start of the image display application, the CPU 103 reads the image display application program from the secondary storage device 105 to the primary storage device 104, and the CPU 103 executes the program.

First, at step S101, the CPU 103 analyzes image files stored in a designated folder in the secondary storage device 105, and displays thumbnails of the image files in list form as shown in FIG. 4A on the display 101. At this time, the position-related icons are not superposed on the thumbnail images.

At step S502, the CPU 103 determines whether or not the display selection button 401 has been operated, and when it determines that the operation of the display selection button has not been performed, waits until the operation is performed. When the operation of the display selection button 401 is detected, the CPU 103 proceeds with the processing to step S503. At step S503, the CPU 103 analyzes the image data files to be displayed, and regarding each of the image data files, determines whether or not the positioning information portion is recorded in the image data file. When the CPU 103 determines that the positioning information portion is described, the CPU 103 proceeds with the processing to step S504, while it determines that the positioning information portion is not described, the CPU proceeds with the processing to step S505. At step S504, a thumbnail of image data, on which the pin icon is superposed, is displayed. On the other hand, regarding an image data file without positioning information portion, this processing is not performed. These processes are repeated until it is determined at step S505 that all the display subjects have been processed. When the processes at steps S503 to S505 have been performed, the screen changes to that as shown in FIG. 4B.

At step S506, the CPU 103 waits until the display selection button 401 is operated. When the operation of the display selection button 401 is detected, the CPU 103 proceeds with the processing to step S507. At step S507, the CPU 103 determines whether or not the positioning information portion is recorded in the image data file to be displayed. When the CPU 103 determines that the positioning information portion is recorded, the CPU 103 proceeds with the processing to step S508, while it determines that the positioning information portion is not recorded, proceeds with the processing to step S509.

At step S508, the CPU 103 superimposes an icon corresponding to the positioning method of the described positioning information portion and displays the thumbnail image. The method of display will be described later. This processing is not performed on an image file where no positioning information is recorded. These processes are repeated until it is determined at step S509 that all the display subjects have been processed.

The details of the processing at step S508 in FIG. 5 will be described below with reference to the flowchart of FIG. 6. This processing, corresponding to the processing at step S508, is performed when an image file of interest has a positioning information portion.

First, at step S601, the CPU 103 analyzes the image file of interest, and determines whether or not there is a description of a positioning method. When the CPU 103 determines that a positioning method is recorded, it proceeds with the processing to step S602. When the CPU 103 determines at step S601 that any positioning method is not recorded, it proceeds with the processing to step S610.

At step S602, the CPU 103 refers to the positioning method information in the header information of the image file of interest, and determines whether or not the first positioning method information (described at first) in the image data is "GPS", i.e., whether or not the positioning method uses a GPS. When the CPU 103 determines that the first positioning method information is "GPS", it proceeds with the processing to step S606. When the CPU 103 determines that the first positioning method information is not "GPS", it proceeds with the processing to step S603. At step S606, the GPS icon in place of the pin icon is superimposed on a thumbnail of the image file of interest. Then the CPU 103 proceeds with the processing to step S650, then returns to the main processing (FIG. 5).

At step S603, the CPU 103 determines whether or not the first positioning method information of the image data is "WLAN", i.e., the first positioning method in the image data uses a wireless LAN. When the CPU 103 determines at step S603 that the first positioning method is "WLAN", it proceeds with the processing to step S607. At step S607, a wireless LAN icon in place of the pin icon is superposed on the thumbnail of the image file of interest. Then the CPU 103 proceeds with the processing to step S650. On the other hand, when the CPU 103 determines at step S603 that the positioning method is not "WLAN", it proceeds with the processing to step S604.

At step S604, the CPU 103 determines whether or not the first positioning method information in the image data is "MANUAL", i.e., the spot information in the image data is manually added. When the CPU 103 determines at step S604 that the first positioning method information is "MANUAL", it proceeds with the processing to step S608. At step S608, the manual operation icon in place of the pin icon is superimposed on the thumbnail of the image file of interest, and the process proceeds with the processing to step S650. Further, when the CPU 103 determines at step S604 that the first positioning method information is not "MANUAL", it proceeds with the processing to step S605.

At step S605, the CPU 103 determines whether or not the first positioning method information in the image file of interest is "CELLID", i.e., the spot information in the image data has been added using a cellular phone base station. When the CPU 103 determines that the first positioning method information is "CELLID", it proceeds with the processing to step S609. At step S609, the CPU 103 superimposes a cell icon in place of the pin icon on the thumbnail of the image file of interest, and proceeds with the processing to step S650. Further, when the CPU 103 determines at step S605 that the first positioning method information is not "CELLID", it proceeds with the processing to step S610.

At step S610, the pin icon in place of the cell icon is superimposed on the thumbnail of the image file of interest. Note that when it is determined at step S605 that the first positioning method information in the image file of interest is not "CELLID", it may be determined that the positioning information portion is recorded but an unknown positioning method is described. In this case, it may be arranged such that an icon indicating the unknown positioning method in place of the pin icon is superimposed on the thumbnail, otherwise, superimposed image is not displayed. As a result of the above processing, the screen shown in FIG. 4C is displayed.

<Icon Operation>

FIG. 7A shows a display screen example when the user designated (selected) a thumbnail of an image (in the figure, a thumbnail in an upper left position). As a method of designation (selection), a selection subject may be changed by operating upward/downward/leftward/rightward keys provided on the console 102. Further, it may be arranged such that a status where a cursor interlocked with a pointing device such as a mouse is positioned on the corresponding thumbnail (or on an icon on the thumbnail) is regarded as a designated (selected) status. In any case, when a thumbnail (Image 1) is designated, detailed information 700 of the positioning information portion of the image corresponding to the designated thumbnail is displayed. As the detailed information 700 in the case of FIG. 7A, in addition to the position information obtained from a GPS satellite signal, information on positioning using GPS, such as the number of satellites upon acquisition of the position information and positioning reliability, are displayed. The number of satellites and the positioning reliability are recorded as a part of Exif 2.3 standard tag information.

Note that the display of the detailed information 700 is made, not with the designation of thumbnail as a trigger, but with detection of GPS icon on the thumbnail, or detection of a pointer such as a mouse cursor on the GPS icon, as a trigger. In such case, it is possible to select the image data itself by clicking other part than the GPS icon. This arrangement is similarly applicable to the other icons.

FIG. 7B shows an example where the designated thumbnail has the wireless LAN icon. In the example of FIG. 7B, detailed information 701 of the positioning information portion of "Image 8" is displayed. As the detailed information 701, in addition to the latitude and longitude, information on positioning using a wireless LAN such as an address of a wireless LAN access point is displayed.

Figure 8A:
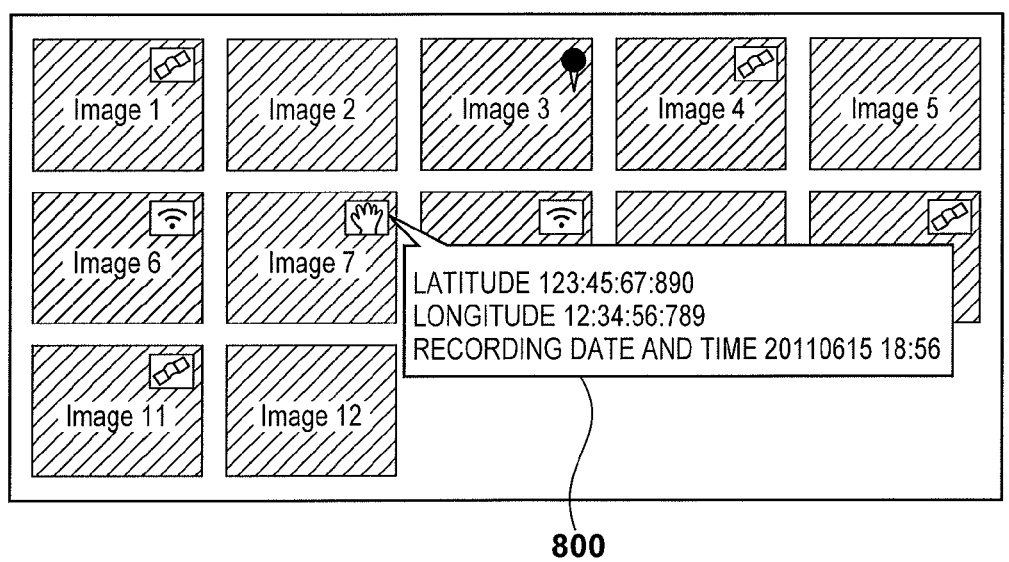
FIGS. 8A and 8B are other display examples of details of position information in balloon form.

FIG. 8A shows a display screen when the designated thumbnail has the manual operation icon. In the example of FIG. 8A, detailed information 800 of the positioning information portion of the image file "Image 7" is displayed. As the detailed information 800, in addition to the latitude and longitude, time at which the position information has been added to the image data is displayed.

Figure 8B:
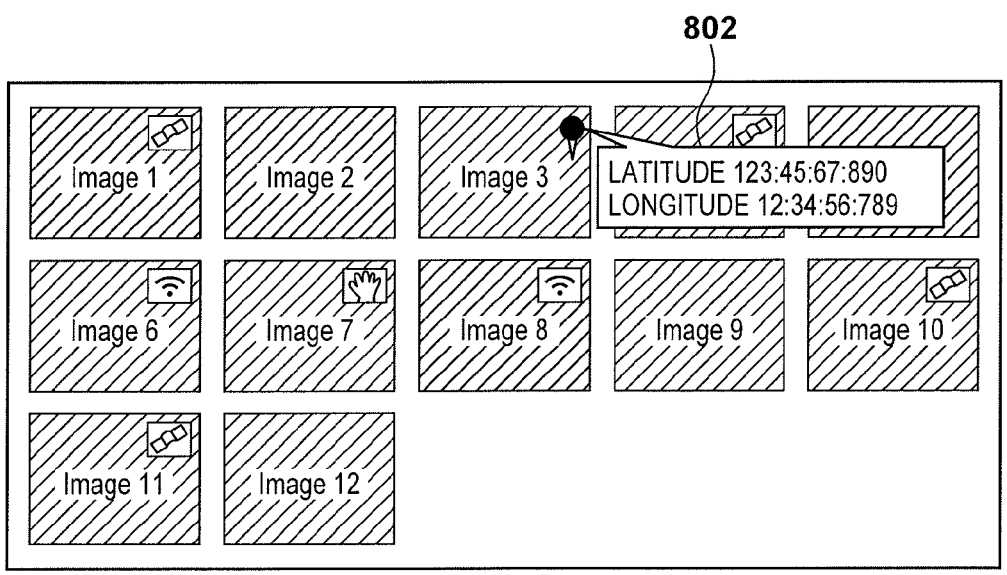

FIG. 8B shows a display screen when the designated thumbnail has the pin icon. In the example of FIG. 8B, detailed information 801 of the positioning information portion of the image file "Image 3" is displayed. In the pin icon indicating that there is no positioning method information, latitude information and longitude information are displayed.

Note that in the screen shown in FIG. 4B, all the icons are pin icons. In this screen, when a thumbnail is selected, latitude and longitude are displayed as in the case of FIG. 8B regardless of positioning method, and positioning-method specific information is not displayed. This arrangement is based on the supposition that the user pays attention to the position information itself in the screen of FIG. 4B, while the user pays attention to the positioning method in the screen of FIG. 4C. Further, even when a thumbnail having a pin icon is selected for the purpose of displaying information in detail as much as possible, information corresponding to the positioning method may be displayed.

Figure 9:
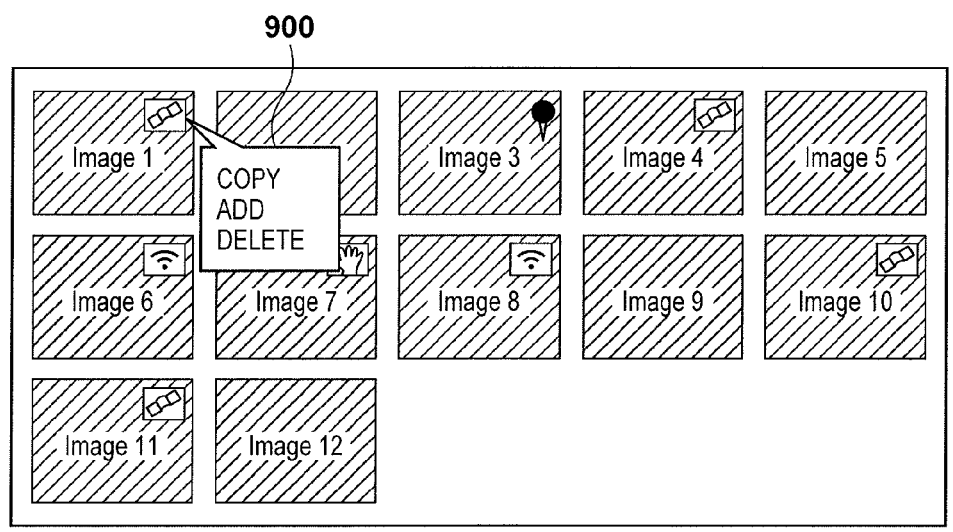
FIG. 9 is a display example of an editing menu for position information.

FIG. 9 is a display for editing an icon. For example, the CPU 103 displays an editing menu 900 having plural editing items in accordance with predetermined operation of e.g. moving the cursor on a GPS icon and right-button click of the mouse. The editing menu 900 has three editing items, "copy", "add" and "delete", prepared so as to edit detailed information of the GPS icon and positioning method information. When any one of the editing item is designated, the CPU 103 performs editing processing in accordance with the designated editing item. For example, when the item "copy" is selected, it is possible to copy the detailed information such as the spot information, the number of GPS satellites and the positioning reliability, recorded in the image data of the right-clicked GPS icon, and the positioning method, recorded in the image data, in the temporary storage memory (generally referred to as a "clip board"). When the icon "delete" is selected, it is possible to delete the detailed information such as the position information, the number of GPS satellites and the positioning reliability and the positioning method recorded in the image data, and it is possible to delete the icon from the display screen. When the icon "add" is selected, only when "copy" has been selected in the editing menu for the icon of another image data prior to the selection of the icon "add", the detailed information of the above-described other image data, as a copy original data and the positioning method are added to the copy destination image data. Note that it is not necessary to add all the detailed information. For example, it may be arranged such that only the positioning method information is added.

Further, the icon indicating the positioning method of the above-described other image data as the copy original data is additionally displayed on the copy destination image data. Note that the detailed information added to the copy destination image data is recorded in MakerNote as one of the Exif 2.3 tags. The positioning method added to the copy destination image data is recorded in the first GPS Processing Method tag, and the positioning method initially recorded in the copy destination image data is re-recorded in the second tag. Then, the icon display is changed, and as described above, an icon indicating a high-level contribution positioning method and small icon indicating a low-level contribution positioning method are displayed.

The above description has been made with the GPS icon as an example, however, a similar editing menu is displayed upon right-click of the wireless LAN icon, the manual operation icon and the pin icon. Further, in a status where information of some icon is copied, when right click is performed on image data with no icon display, only the item "add" is displayed as an editing menu. When the icon "add" is selected, the detailed information such as the spot information and the positioning method information is added to the right-clicked image data. It is not necessary to add all the detailed information. For example, only the positioning method information may be added.

As described above, in the present embodiment, by referring to the positioning method information described as attribute information of image data indicating, not only existence/absence of positioning information of the image, but the type of the positioning method, is superimposed on a thumbnail image. With this arrangement, it is possible for the user to easily check the positioning method used upon acquisition of spot information of the image data.

Note that in the present embodiment, every time the display selection button 401 is operated, the display format is looped (FIG. 4A->FIG. 4B->FIG. 4C->FIG. 4A . . . ). However, it may be arranged such that one of the display types is directly designated from the display menu and the display is made in accordance with the designated display type. Accordingly, the present invention is not limited to the above example.

[Second Embodiment]

In the above-described first embodiment, an icon indicating the type of positioning information is superimposed on a thumbnail based on the first positioning method information described as the attribute information of an image file. In the second embodiment, when the second positioning method information exists, it is displayed too.

Figure 10:
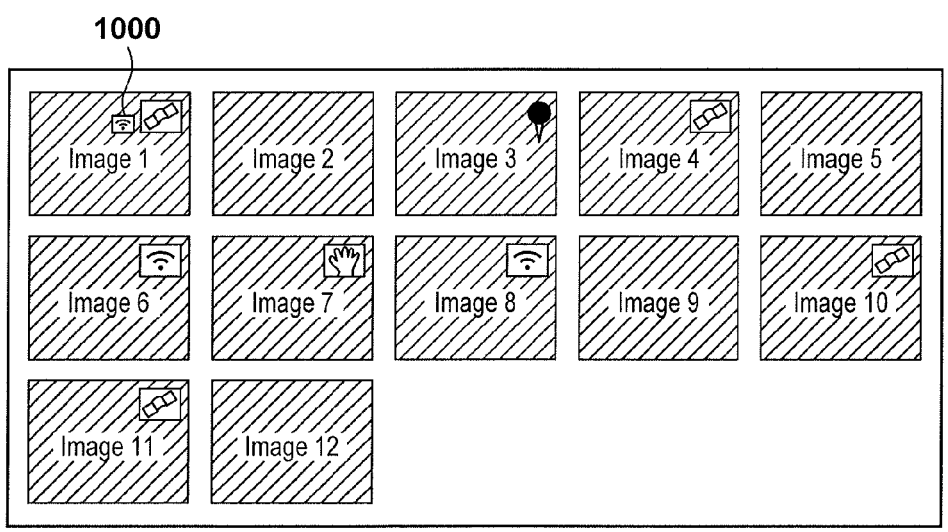
FIG. 10 is a display example of images in list form in a second embodiment.

FIG. 10 shows a display example of images in list form in the second embodiment. In FIG. 10, an image file positioned at an upper left corner is subjected to positioning using two positioning methods, GPS and WLAN. The first positioning method "GPS" is a first sized icon, and the second positioning method "WLAN" is a second sized icon smaller than the first size, and they are superposed on the thumbnail. To reduce a region of the thumbnail image hidden with the icons, the second positioning method icon is smaller.

Figure 5:
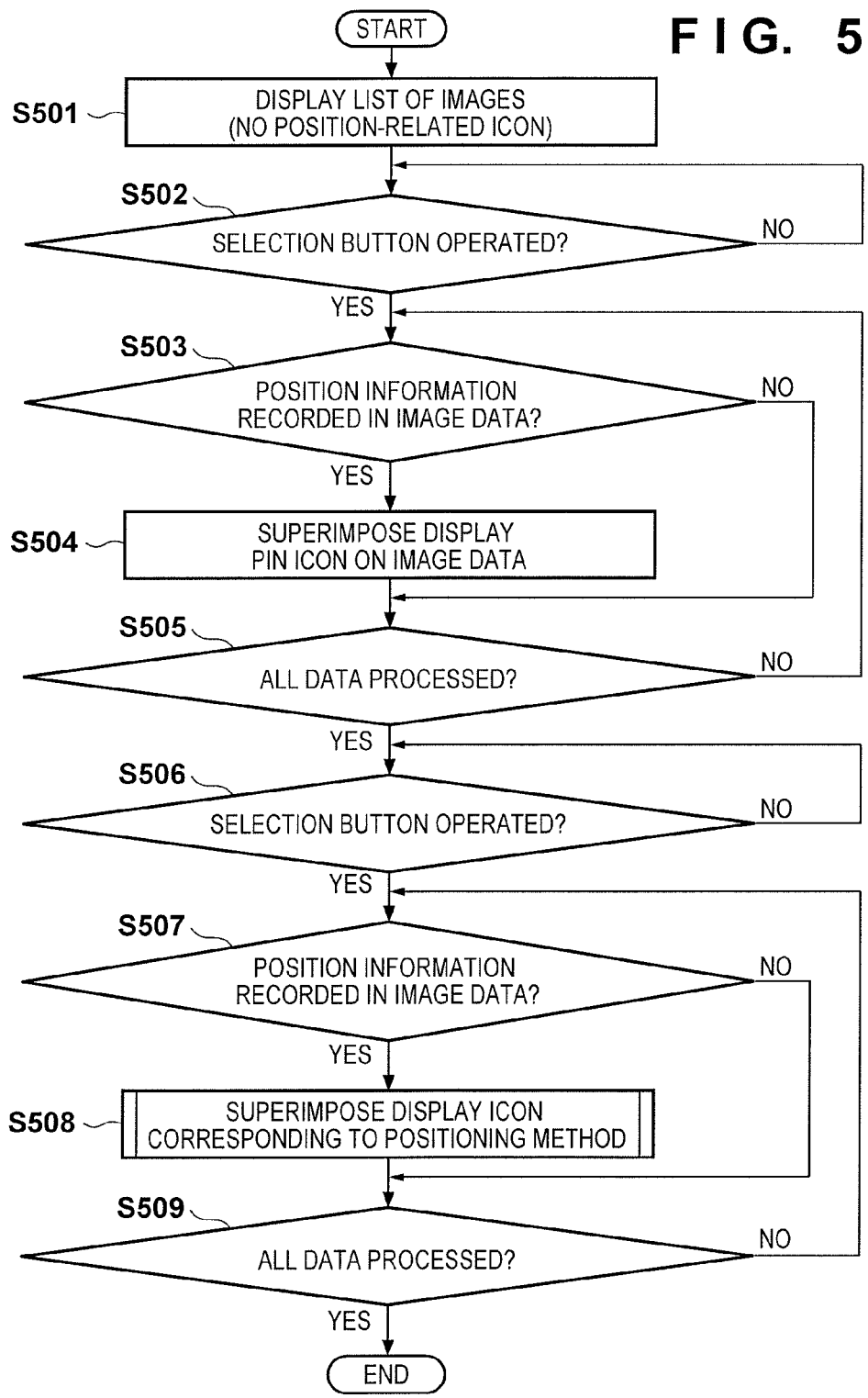
FIG. 5 is a flowchart showing a processing procedure in the first embodiment.
Figure 6:
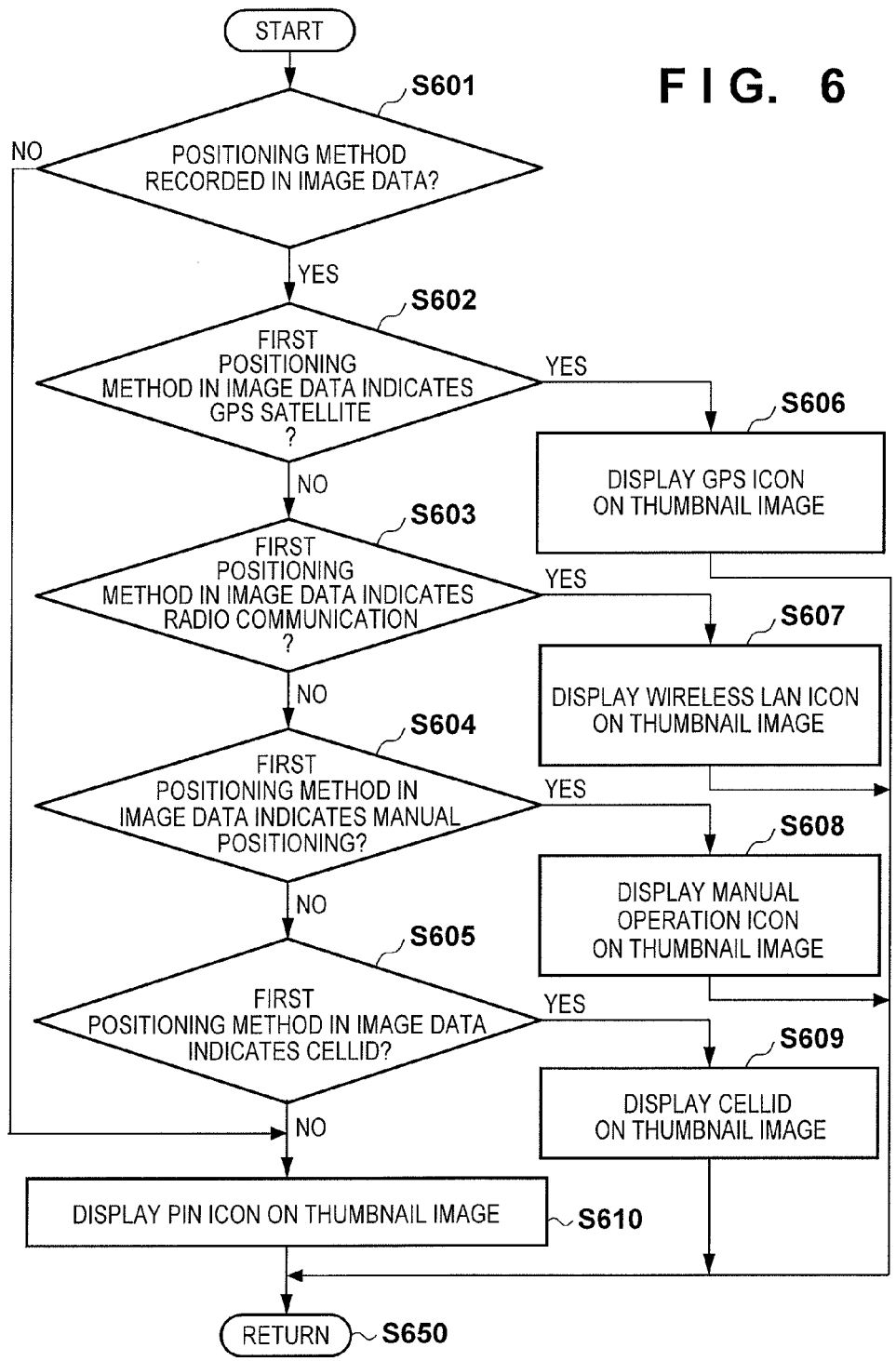
FIG. 6 is a flowchart showing the details of step S508 in FIG. 5.
Figure 11A:
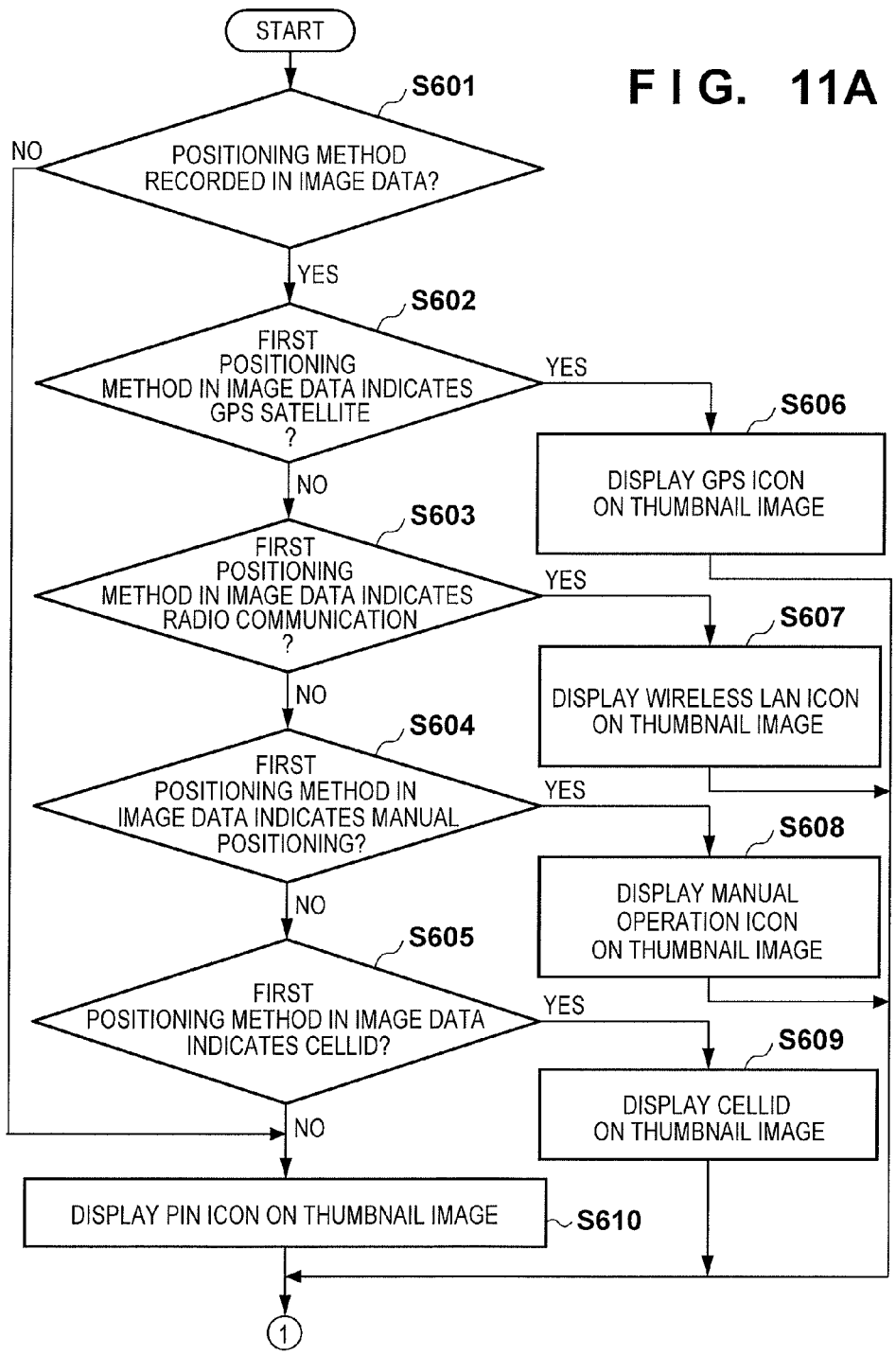
FIGS. 11A and 11B are flowcharts showing the details of step S508 in FIG. 5 in the second embodiment.
Figure 11B:
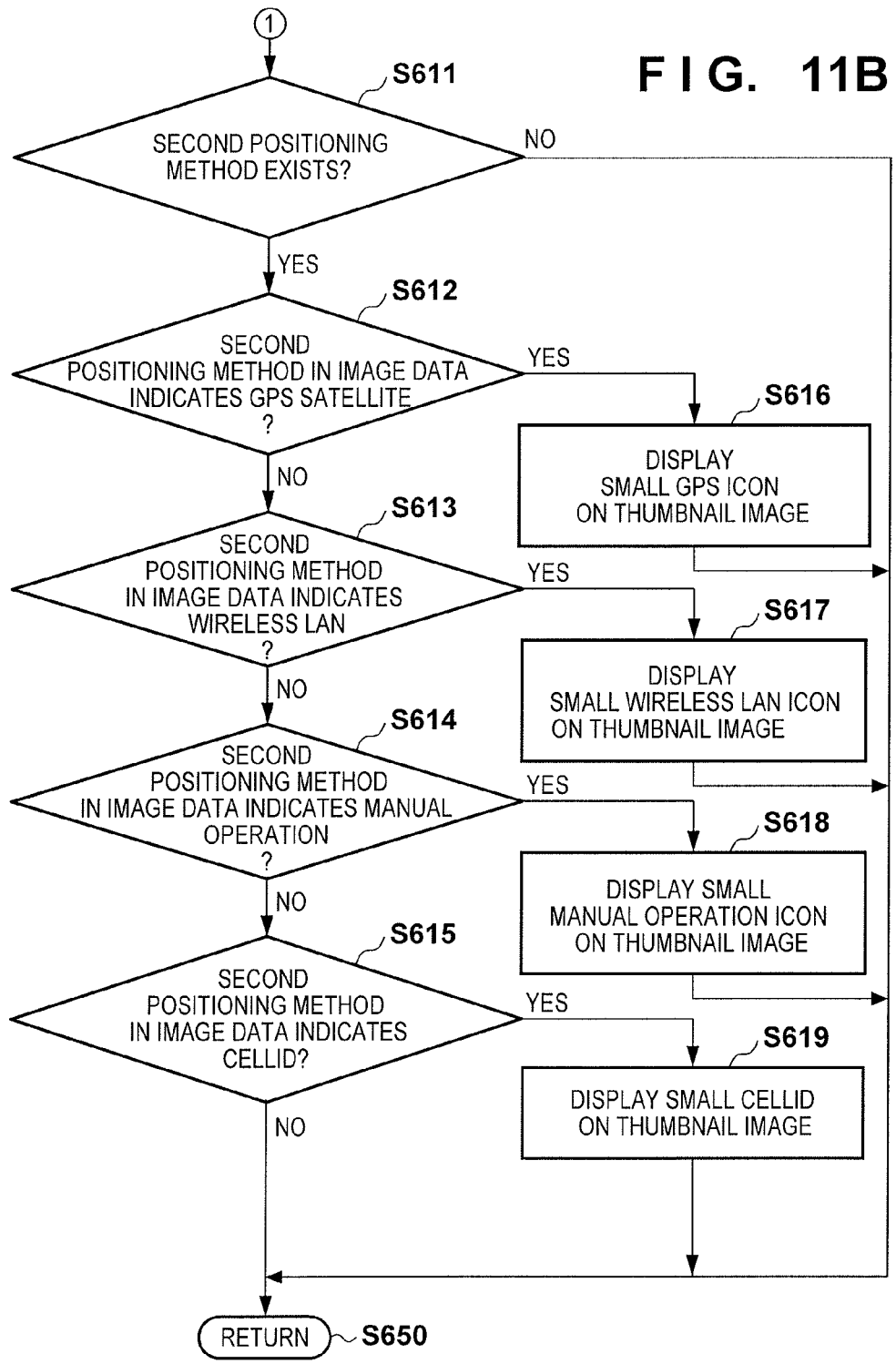

When the display screen in FIG. 10 is a display example in place of that shown in FIG. 4C in the first embodiment, at step S508 in FIG. 5, the CPU 103 performs processing in accordance with the flowcharts of FIGS. 11A and 11B. Note that steps S601 to S610 and step S650 in the flowcharts of FIGS. 11A and 11B are identical to those in the flowchart of FIG. 6. Accordingly, these steps have the same reference numerals, and hereinbelow, processing at step S611 and the subsequent steps will be described.

Note that in the processing up to step S610, the icon of the initial positioning method is already superimposed on the thumbnail image.

At step S611, the CPU 103 analyzes the positioning information portion of the image file of interest, and determines whether or not the second positioning method is recorded. When the CPU 103 determines as a result of determination that the second positioning method is recorded, it proceeds with the processing to step S612. On the other hand, when the CPU 103 determines that the second positioning method is not recorded, then at step S650, it returns to step S509 in the flowchart of FIG. 5.

At step S612, the CPU 103 determines whether or not the second positioning method information of the image file of interest is "GPS". When the CPU 103 determines that the second positioning method information is "GPS", it proceeds with the processing to step S616. At step S616, the GPS icon in a size smaller than the first positioning method icon is superimposed adjacent to the first positioning method icon. Then the CPU 103 proceeds with the processing to step S650, and returns to the main processing. Further, when the CPU 103 determines at step S612 that the second positioning method information is not "GPS", it proceeds with the processing to step S613.

At step S613, the CPU 103 determines whether or not the second positioning method information of the image file of interest is "WLAN". When the CPU 103 determines that the second positioning method information is "WLAN", it proceeds with the process to step S617. At step S617, the wireless LAN icon is superimposed, in a size smaller than that of the already displayed icon, adjacent to the already displayed icon. Then, the CPU 103 returns through step S650 to the main processing. Further, when the CPU 103 determines at step S613 that the second positioning method information is not "WLAN", it proceeds with the process to step S614.

At step S614, the CPU 103 determines whether or not the second positioning method information of the image file of interest is "MANUAL". When the CPU 103 determines that the second positioning method information of the image file of interest is "MANUAL", it proceeds with the process to step S618. At step S618, the manual operation icon is superimposed, in a size smaller than the already display icon, adjacent to the already displayed icon. Then the CPU 103 returns through step S650 to the main processing. Further, when the CPU 103 determines at step S614 that the second positioning method information of the image file of interest is not "MANUAL", it proceeds with the process to step S615.

At step S615, the CPU 103 determines whether or not the second positioning method information of the image file of interest is "CELLID". When the CPU determines that the second positioning method information of the image file of interest is "CELLID", it proceeds with the process to step S619. At step S619, the cell icon is superimposed, in a size smaller than the already display icon, adjacent to the already displayed icon. Then the CPU 103 returns through step S650 to the main processing.

Then, when the CPU 103 determines at step S615 that the second positioning method information of the image file of interest is not "CELLID", it returns through step S650 to the main processing. Note that when the determination result at step S615 is No, it can be considered that some unknown data (or unknown positioning information) is described as the second positioning method information. In this case, as the spot information itself is described, it may be arranged such that the pin icon is continuously displayed or an icon indicating known positioning information is superimposed.

The processing of displaying an icon in accordance with positioning method on a thumbnail image of each image data in the second embodiment is as described above.

Note that the display screen in FIG. 10 in the second embodiment has been described as an example in place of FIG. 4C, however, it may be arranged such that, in the screen shown in FIG. 4C, when the display selection button 401 is operated, then the display screen in FIG. 10 is displayed next.

[Third Embodiment]

In a third embodiment, it is possible to display a map on the PC side. Note that as many parts of the third embodiment correspond to those in the first embodiment, the explanations of the corresponding parts will be omitted and a part specific to the present embodiment will be mainly described. Note that the secondary storage device 105 previously holds a map database to output a map image including a given position, retrieved using the position as a key. That is, it is possible to designate a position indicated with latitude and longitude and retrieve the position, and obtain map data in a designated scale from the database. Note that since a technique of retrieval using a position from a map database, typified by car navigation, is well known, the detailed description of the technique will be omitted.

Figure 12:
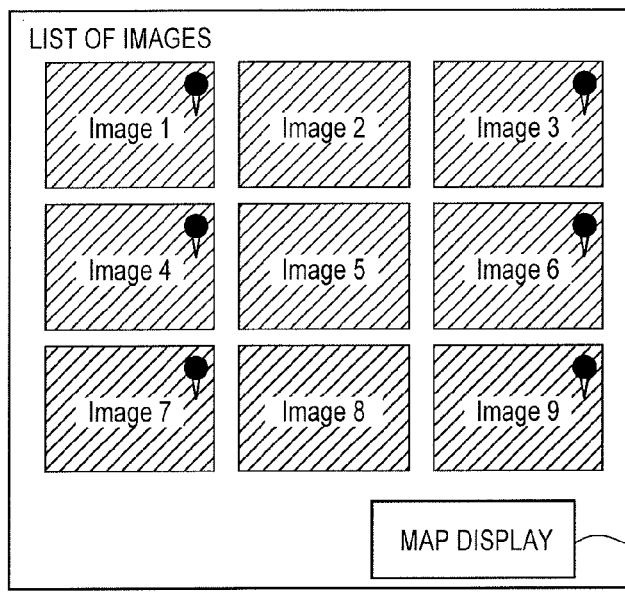
FIG. 12 is a display example of images in list form in a third embodiment.

FIG. 12 is a display example of images in list form in the third embodiment. In the screen shown in FIG. 12, the list of image files is displayed along with their thumbnail images. Image data which cannot be displayed within the screen can be displayed by scroll operation.

In the third embodiment, with respect to an image file having at least latitude and longitude information, the pin icon is superimposed on the thumbnail of the image file. In this screen, the pin icon is uniformly displayed with respect to image data having latitude and longitude information, regardless of positioning method information. With respect to an image file without latitude and longitude information, the pin icon is not displayed. Further, the image list screen has a map display button 1201.

When the map display button 1201 is clicked with a mouse or the like, the CPU 103 determines a rectangular range of a map to be displayed as a default, from a mean position of the latitudes and longitudes of all the pin-icon superimposed image files (latitude mean value and longitude mean value) and latitude maximum and minimum values and longitude maximum and minimum values. Then the CPU 103 obtains a map image from the map database, enlarges/reduces it to be displayed in the display region, and displays the pin icon in the position of each image data file indicated with latitude and longitude.

Figure 13:
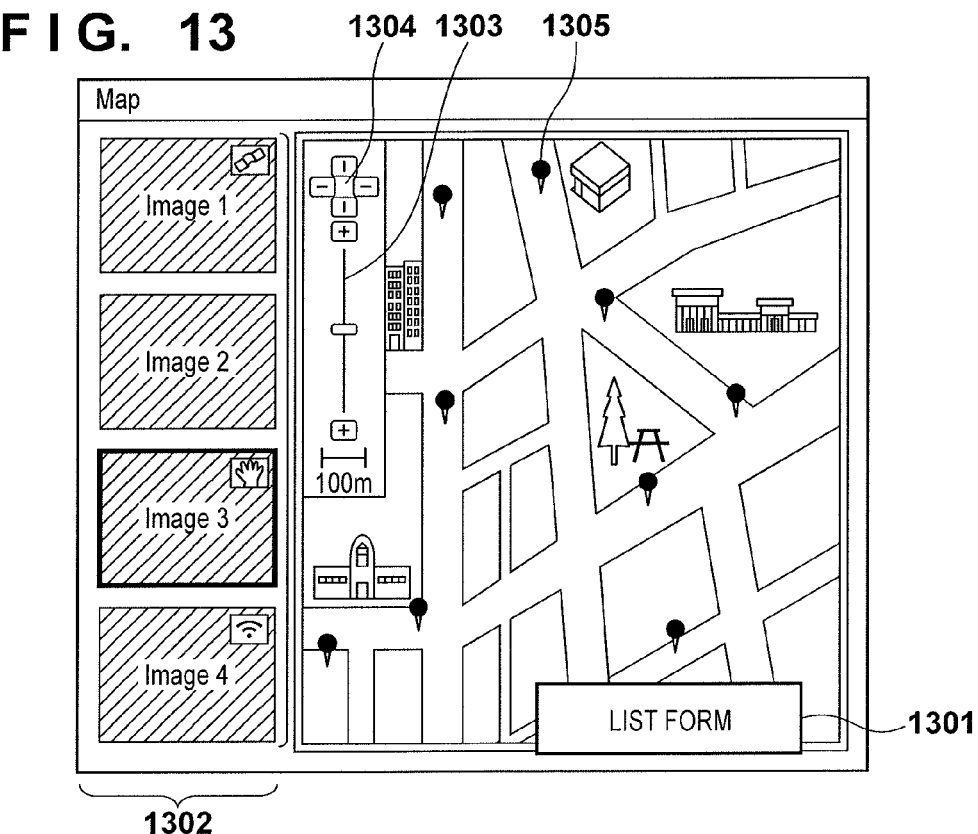
FIG. 13 is a display example of a map in the third embodiment.

FIG. 13 shows a display screen example of the pin icons displayed on the above-described map. This screen is briefly formed with a map region to display a map image and a list display region 1302 to display scrollable list of thumbnail images in a vertical direction. When the list display button 1301 is clicked, the CPU 103 performs processing to return the map display status in the figure to the list display as shown in FIG. 12. A slider bar 1303 is used for control of map scale. A direction key group 1304 is used for scroll of the map upward/downward/leftward/rightward.

Further, when the user operates the mouse to move the cursor to a desired pin position and clicks on the position, the CPU 103 scrolls screen such that the thumbnail of an image corresponding to the pin is positioned within the image display region 1302. Further, the CPU 103 displays the thumbnail with a bold frame (the color of the frame may be changed) to be distinguished from other thumbnails.

As a result of the above arrangement, it is also possible to check an image obtained by image sensing, in the position of image sensing, by designating the pin icon on the map.

Further, one of specific displays in the screen shown in FIG. 13 is icon display in the list display region. In FIG. 12, the pin icons are uniformly displayed, while in FIG. 13, icons corresponding to the positioning methods of the respective image data (the GPS icon, the wireless LAN icon, the cell icon and the pin icon) are displayed. In the map display status, as the user is interested in position information, the more detailed information regarding the position information is necessary.

As described above, in the third embodiment, as to whether or not the screen is for map display, i.e., whether or not the screen is for utilization of position information, the form of icon related to position information is changed. With this arrangement, it is possible for the user to more easily check the necessary information. Note that the screen in FIG. 12 in the second embodiment may be displayed as one of the screens in FIGS. 4A to 4C. Further, the map display button 1201 may be displayed not in the screen in FIG. 12 but in the display screen in FIG. 4C and FIG. 10.

As described above, the respective embodiments of the present invention have been described, however, the present invention is not limited to an application executed on a PC. The present invention is applicable to any apparatus as long as it stores and manages image files and displays them. For example, the invention may be realized with a digital camera or a cellular phone.

Further, in the above-described embodiment, upon display of image files in list form, thumbnails of the respective image files are displayed, and icons indicating presence/absence of positioning information and the type of positioning method are superimposed. However, the image files may be distinguished with a list of file names and character colors, or type icons and file names may be displayed. Note that since it is desirable for the user to check images displayed in list form to some degree, the superimposition of the icons on the thumbnails as described in the above embodiment is preferable.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-011507, filed Jan. 23, 2012, which is hereby incorporated by reference herein in its entirety.

The invention claimed is:

1. An image display control apparatus which performs control to display a list of image files stored in a storage unit, comprising:
   a determination unit configured to analyze each image file stored in the storage unit, and determine whether or not the image file includes position information indicating a position and whether or not the image file includes positioning method information indicating a positioning method for the position; and
   a display control unit configured to, upon display of the list of image files stored in the storage unit, in accordance with the result of determination by the determination unit, display an image file including the position information in an appearance distinguishable from an image file not including the position information, while displaying a type of the positioning method indicated with the positioning method information in the image file including the position information, in a distinguishable appearance.

2. The image display control apparatus according to claim 1, wherein the display control unit displays, regarding the image file not including the position information, a thumbnail of an image represented with the image file, while regarding the image file including the position information, superimposes an icon corresponding to the type of the positioning method indicated with the positioning method information on a thumbnail of an image represented with the image file.

3. The image display control apparatus according to claim 2, wherein when the determination unit determines an image file including first positioning method information and second positioning method information as the positioning method information, the display control unit superimposes an icon, having a first size, corresponding to the type of the positioning method indicated with the first positioning method information, and an icon having a second size smaller than the first size, corresponding to the type of the positioning method indicated with the second positioning method information, on the thumbnail of the image represented with the determined image file.

4. The image display control apparatus according to claim 1, further comprising:
   a designation unit configured to designate one of the image files displayed in list form by the display control unit; and
   a position information display unit configured to, when the image file designated by the designation unit includes the position information, display detailed information of the position information in a balloon form.

5. The image display control apparatus according to claim 1, further comprising:
   a designation unit configured to designate one of the image files displayed in list form by the display control unit;
   a menu display unit configured to, when the image file designated by the designation unit includes the position information and a predetermined operation is performed, display an editing menu including a plurality of editing items for the position information; and
   an editing unit configured to, when one of the displayed editing items is designated, perform editing processing corresponding to the designated editing item with respect to the position information of the image file.

6. The image display control apparatus according to claim 2, further comprising:
   a map database to output a map image including a position indicated with a given position information, in accordance with the position information;
   a display device having a list display region to display thumbnails of a plurality of image files in a scrollable form and a map region to display a map image; and
   a map display unit configured to calculate a mean position from image files having the position information, among the image files stored in the storage unit, obtain a map image, using the mean position as a key, from the map database, and display the map image in the map region,
   wherein the display control unit displays the thumbnails of the respective image files in the list display region, and further, regarding an image file having the position information, displays a predetermined icon in a position indicated with the position information in the map image.

7. A control method for an image display control apparatus which displays a list of image files stored in a storage unit, comprising:
   determining, by analyzing each image file stored in the storage unit, whether or not the image file includes position information indicating a position and whether or not the image file includes positioning method information indicating a positioning method for the position; and displaying, upon display of the list of image files stored in the storage unit, in accordance with the result of determination, an image file including the position information in an appearance distinguishable from an image file not including the position information, while displaying a type of the positioning method indicated with the positioning method information in the image file including the position information, in a distinguishable appearance.

8. A non-transitory computer-readable storage medium storing a computer program read and execute by a computer to cause the computer to perform control method, the control method comprising:

determining, by analyzing each image file stored in a storage unit, whether or not the image file includes position information indicating a position and whether or not the image file includes positioning method information indicating a positioning method for the position; and displaying, upon display of the list of image files stored in the storage unit, in accordance with the result of determination, an image file including the position information in an appearance distinguishable from an image file not including the position information, while displaying a type of the positioning method indicated with the positioning method information in the image file including the position information, in a distinguishable appearance.

* * * * *